2 Sheets—Sheet 1.

J. F. BLAIR.
WASHING-MACHINE.

No. 183,115.  Patented Oct. 10, 1876.

WITNESSES
Villette Anderson
Walter C. Masi

INVENTOR
John F. Blair
by E. W. Anderson
ATTORNEY

JAMES R. OSGOOD & CO. BOSTON

2 Sheets—Sheet 2.

J. F. BLAIR.
WASHING-MACHINE.

No. 183,115. Patented Oct. 10, 1876.

WITNESSES
Villette Anderson
Walter C. Class

INVENTOR
John F. Blair,
by E. W. Anderson
ATTORNEYS.

JAMES R. OSGOOD & CO. BOSTON.

UNITED STATES PATENT OFFICE.

JOHN F. BLAIR, OF FREDONIA, KANSAS.

IMPROVEMENT IN WASHING-MACHINES.

Specification forming part of Letters Patent No. 183,115, dated October 10, 1876; application filed August 12, 1876.

*To all whom it may concern:*

Be it known that I, JOHN F. BLAIR, of Fredonia, in the county of Wilson and State of Kansas, have invented a new and valuable Improvement in Washing-Machines; and I do hereby declare that the following is a full, clear, and exact description of the construction and operation of the same, reference being had to the annexed drawings, making a part of this specification, and to the letters and figures of reference marked thereon.

Figure 1:
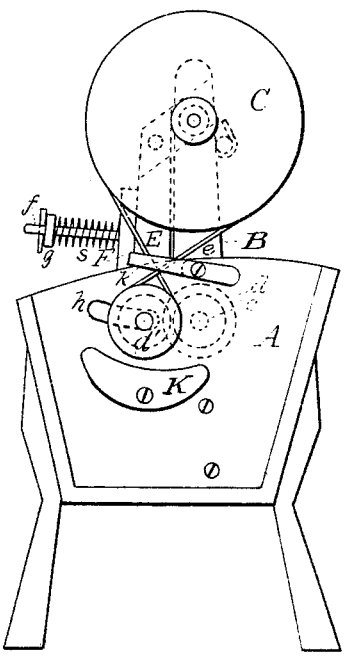
Figure 2:
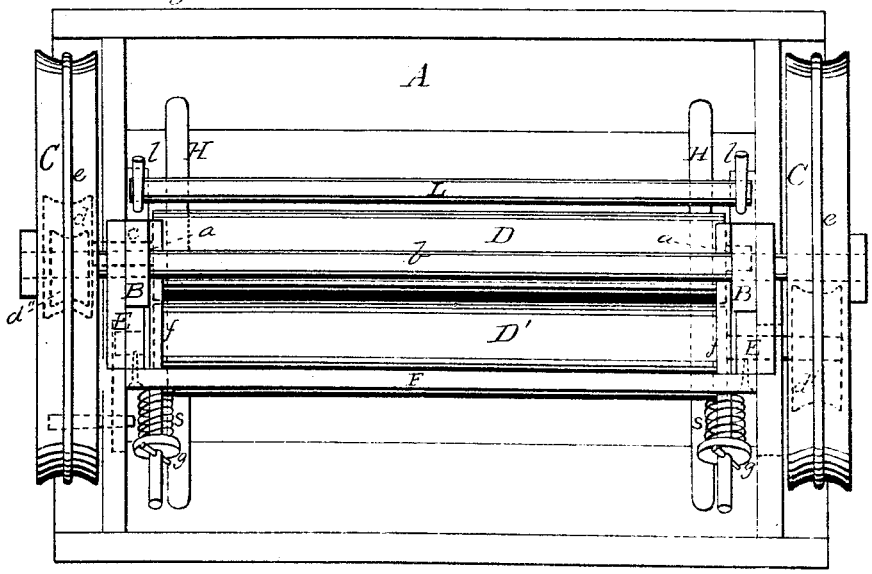
Figure 3:
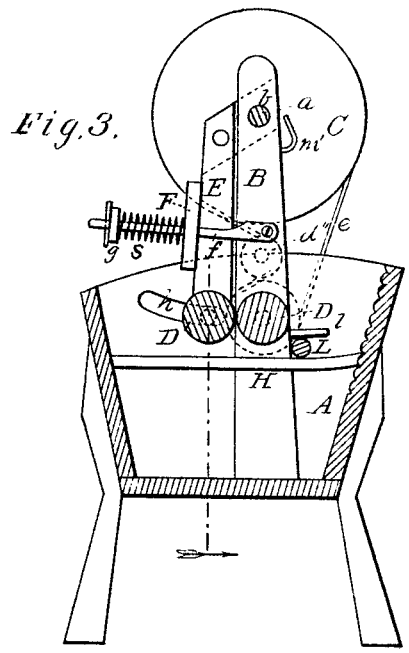
Figure 4:
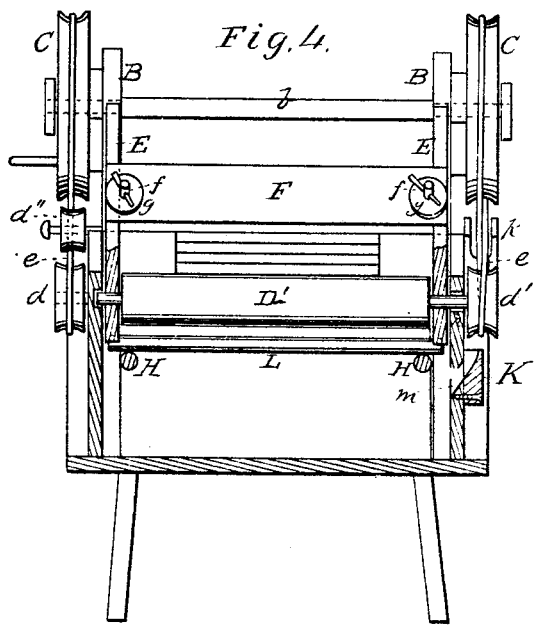

Figure 1 of the drawings is a representation of an end view of this invention. Fig. 2 is a top view of the same. Fig. 3 is a vertical transverse section, and Fig. 4 is a vertical longitudinal section.

This invention has relation to washing-machines; and it consists in the construction and novel arrangement of the elevated driving-pulleys, and the double washing-rollers connected therewith, at opposite ends of the box or tub; the swinging washing-roller and its spring attachments; the slot and guide for the swinging roller and its operating-rope; the guard-slats at the ends of the box; and the movable roller, adapted to be placed in elevated bearings over the tub for wringing, as hereinafter fully shown and described.

In the accompanying drawings, the letter A designates the box or tub of the washing-machine. To the ends of this tub are attached fixed vertical standards B, in the upper ends of which are the bearings $a$ of the shaft $b$ of the large driving pulleys or wheels C C. At the lower ends of these standards are bearings for the journals of the stationary washing-roller, one of said bearings extending through the wall of the box A, as shown at $c$. D D' represent, respectively, the stationary and swinging washing-rollers, which are provided at opposite ends with pulleys $d$ $d'$, respectively, which are connected, by means of suitable cords or belts $e$, with the large driving-wheels C C. In order that these rollers may turn toward each other, the cord $e$ at one end of the box is crossed between the drive-wheel and the pulley of the swinging roller. This arrangement also serves to increase the bearing of the cord on the pulleys, and the consequent friction is designed to aid in preventing the cord from slipping. At the other end of the box a similar effect is produced with relation to the stationary roller by the introduction of an idle-pulley, $d''$, between the end pulley and drive-wheel, around which one branch of the cord is led, as shown in the drawings. E E designate bent arms, which are pivoted to the shaft $b$ of the large driving-wheels, which is elevated some distance above the top of the box. These arms are arranged to have vibratory play outward from the standards B, and are provided at their lower ends with bearings for the journals of the swinging roller D', which lies against the roller D. The arms E E are connected and braced by a bar, F, through which arms $f$, attached to the standards B, extend to receive coiled springs $s$, which bear against said bar F and collars $g$ on said arms, thereby causing the swinging roller D' to have an elastic pressure against the roller D. $h$ indicates an elongated curved slot in the end wall of the box, through which the journal of the swinging roller extends, whereby sufficient play is allowed to said journal. In order that the movement of the pulley of the swinging roller may not cause its cord or belt to escape from its periphery, a forked guide, $k$, is attached to the box in such a position as to embrace the crossed branches thereof, as shown in the drawings. K indicates a drip pocket or recess on the outside of the box below the pulley $d'$. This is constructed by means of a beveled block or pieces of wood or metal, secured to the face of the end wall of the box, and its recess is designed to communicate with the interior of the box A through an aperture or channel, $m$, whereby the water which may be dashed out through the slot $h$ is designed to be caught and returned into the box. H H represent transverse slats or rails of rounded form in cross-section, secured within the box at a short distance from its ends, and serving to prevent the clothes from becoming entangled in the crevices between the ends of the rollers and the end walls of the box. Above these slats bearing-pins $l$ are inserted in the standards B, and serve as part bearings for a small longitudinal roller, L, which rests by its ends on the slats H and close to the under side of the large roller D, the slats H being somewhat curved or inclined upward and outward, to cause said small roller to fall into this position, where it serves in the washing operation to prevent the clothes from winding around the large rollers. On the standards B, at the upper portions of their edges, are arranged elevated bearings $m'$, near the shaft $b$ of the large drive-pulleys. These bearings are designed for the small roller L, which, for the wringing operation, is designed to be transferred to this elevated position to receive the clothes, which are carried around it and between the large rollers.

The washing is accomplished by the action of the rollers D D', between which the clothes pass, being pinned together or not, as may be desired. The elevated small roller enables the clothes to be wrung immediately after washing or rinsing, several pieces at a time, as the pieces are held by said roller above the surface of the water in the tub. By means of the springs, elastic pressure is produced between the rollers D D', so that cloth or clothes of any thickness can pass through and be operated on in an efficient manner, as well as laces and other thin and delicate fabrics.

What I claim as new, and desire to secure by Letters Patent, is—

1. The combination, with the slotted box A, standards B, and the rollers D, bearing in said standards, of the swinging arms E, springs $s$, bearings, and roller D', bearing in said swinging arms, substantially as specified.

2. The combination, with the shaft $b$ and elevated wheels C C, of the standards B and stationary and swinging rollers D D', having end pulleys and driving cords or belts connecting the latter to said elevated wheels, substantially as specified.

3. The combination, with the box A and stationary and swinging rollers D D', of the transverse guard-slats H H, substantially as specified.

4. The box A, having the stationary and swinging rollers, the movable guard-roller L, and the low and elevated bearings for said guard-roller, substantially as specified.

5. The combination, with the swinging roller D' and its extended journal, passing through a slot in the box-wall, of the drip-pocket, arranged under said slot, substantially as specified.

In testimony that I claim the above I have hereunto subscribed my name in the presence of two witnesses.

JOHN FRANCIS BLAIR.

Witnesses:
PETER KEEGER,
B. M. SHORT.